United States Patent [19]

Silvertson Jr.

[11] 4,184,155
[45] Jan. 15, 1980

[54] RADAR TARGET FOR REMOTELY SENSING HYDROLOGICAL PHENOMENA

[75] Inventor: Wilford E. Sivertson Jr., Yorktown, Va.

[73] Assignee: The United States of America as represented by the Administrator of the National Aeronautics and Space Administration, Washington, D.C.

[21] Appl. No.: 945,041

[22] Filed: Sep. 22, 1978

[51] Int. Cl.² .................... G01S 9/60; H01Q 15/00
[52] U.S. Cl. ........................ 343/5 CM; 343/5 W; 343/18 B; 343/18 D
[58] Field of Search ............... 343/5 CM, 18 B, 18 C, 343/18 D

[56] References Cited

U.S. PATENT DOCUMENTS 3,879,731  4/1975  Mack .................... 343/18 B

Primary Examiner—T. H. Tubbesing
Attorney, Agent, or Firm—William H. King; John R. Manning; Howard J. Osborn

[57] ABSTRACT

Apparatus for remotely measuring and accessing water status relative to snow and glacial melt, surface runoff, rainfall, evaporation, flow rate, and soil moisture. A radar target located at a selected location on the surface of the earth is designed to collect water and render its cross-sectional area variable as a function of the height of the water level within the target. The target is remotely monitored by an orbiting or airborne synthetic aperature radar. The target appears as a bright spot embedded within the radar image. The target brightness is indicative of the height of the water level within the ground located target.

11 Claims, 5 Drawing Figures

RADAR TARGET FOR REMOTELY SENSING HYDROLOGICAL PHENOMENA

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates generally to the measurement of water levels and more specifically concerns apparatus for remotely measuring at many different selected locations on the surface of the earth the water status at those locations.

Prior techniques for monitoring water status use an individual instrument for each measurement type and require active instruments which include power supplies, recorders, transmitters and other in situ instrumentation. Measurement activation or recording requires special interrogation and, in most instances, manned attendance.

The prior techniques for monitoring water status have many disadvantages. They require several different instruments to obtain measurements, they are not suitable for global, day-night, all-weather measurement systems, they are clostly and require expensive upkeep and calibration, they require complex equipment and high technical skills for utilization, and they do not provide daily multiple measurement data without considerable difficulty.

It is therefore the primary object of this invention to provide simple, inexpensive apparatus for obtaining measurements of water status at many selected locations on the surface of the earth.

Another object of this invention is to provide apparatus for obtaining measurements of water status at selected locations on the surface of the earth in which the apparatus located at each of the selected locations is passive.

A further object of this invention is to provide apparatus for remotely measuring at several selected locations on the surface of the earth the water status at those locations in which very little maintenance is required at the several selected locations.

Other objects and advantages of this invention will become apparent hereinafter in the specification and drawings.

SUMMARY OF THE INVENTION

The invention is a radar target whose radar cross-section varies as a function of the height of the water level within the target. The target consists essentially of a right circular cylinder with its central axis perpendicular to the ground level; a flat circular plate symmetrically attached to the lower end of the cylinder and parallel to the ground level surface; and a catch basin including said circular cylinder and said circular plate for catching and retaining water. The circular cylinder and the flat circular plate are made from a material (electrical conductor) that reflects radar signals such as aluminum, copper, and stainless steel; and the remainder of the catch basin is made from a durable material such as concrete or fiberglass. Without any water in the catch basin the radar cross-section of the radar target is a maximum. As the water is caught by the catch basin and the water level rises therein the target radar cross-section decreases. Consequently, the brightness of the image taken by a radar from a satellite or an airplane decreases as the level of the water increases. Hence, by locating many of these radar targets at selected points on the surface of the earth an airplane or satellite can remotely monitor the different radar targets and determine the level of the water in each of the different targets. The level of water in a radar target is indicative of the water status at the location of that particular radar target. A radar target can have holes in the bottom of the catch basin thereby allowing the water in the catch basin to seep into the soil giving an indication of the amount of moisture in the soil by the successive time measurements of water level within the target.

Either one or two of the radar targets can be located at a selected location. The second target when used consists of only the right circular cylinder and the flat circular plate and provides an essentially constant image brightness. That is, the target does not collect water and the image brightness does not vary with water status. The water status is indicated by the ratio of the brightness of the radar targets (one with water collection; one without water collection).

DETAILED DESCRIPTION OF THE INVENTION

Figure 1:
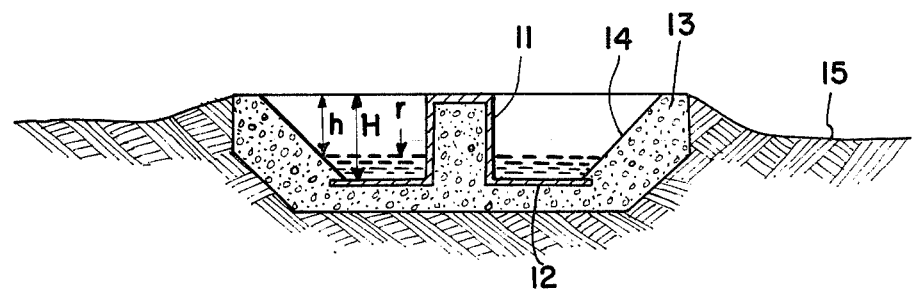
FIG. 1 is a cross-sectional view of a preferred embodiment of the invention.

Turning now to the embodiment of the invention selected for illustration in the drawings, the basic radar target shown in FIG. 1 is a complex RF body formed from an electrically conductive, right circular cylinder 11 and an electrically conductive, circular flat base plate 12. Cylinder 11 and base plate 12 are connected and made out of materials that reflect radar signals such as for example, aluminum, copper or stainless steel. Base plate 12 forms a ground plane and base for the configuration with the cylinder 11 mounted normal to the plate at its center. This assembly is permanently installed within a formed, concrete waterproof catch basin 13.

Internal periphery basin wall 14 is sloped away from reflector cylinder 11 to allow an unobstructed RF field of view for a radar operated at a 45 degree depression angle. The intensity of this target in a radar image is a function of the radar cross-section of the reflector. Also, in this configuration as water collects and evaporates in the catch basin the water surface moves up and down the cylinder length. This movement modifies the RF dimensions of the complex body reflector so that the radar cross-section varies as a function of collected water volume.

The radar cross-section for the configuration in FIG. 1 without a catch basin can be expressed as:

$$\sigma = 8\pi a H^2 (\cos\phi) \lambda^{-1} \quad (1)$$

where:
a = cylinder radius
H = cylinder height
$\phi$ = incident wave angle from plane of flat base plate (ground plane)
$\lambda$ = radar wavelength Thus, from FIG. 1 and equation (1), when $\phi = 45°$ $$r = [1 - (\sigma_2/\sigma_1)^{\frac{1}{2}}]H \quad (2)$$

where:
r = depth of water in catch basin
$\sigma_1$ = radar cross section with r = 0
$\sigma_2$ = radar cross section with r > 0

From equation (2), the height of the water level can be determined by measuring relative reflector image brightness (brightness = f[radar cross-section]) in remotely sensed radar image. From a plot of relative image brightness ($\sigma_2/\sigma_1$) as a function of collected water depth to cylinder height (r/H), this reflector concept can be expected to give reasonably sensitive performance for (r) levels up to approximately 50 percent of the reflector cylinder height.

Figure 2:
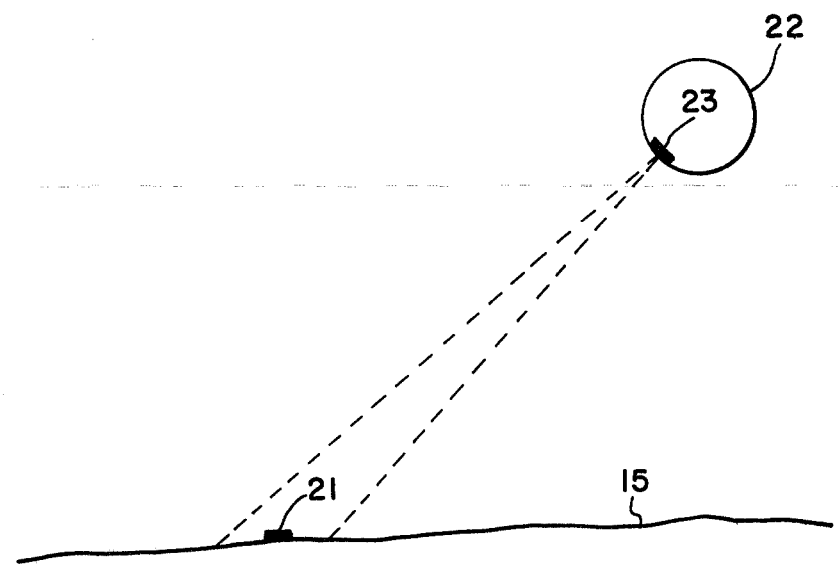
FIG. 2 is a schematic drawing showing how information is gathered from the embodiment of the invention shown in FIG. 1.

The number 21 in FIG. 2 designates an embodiment of the invention in FIG. 1 when used by itself at a selected location on the surface of the earth. A satellite 22 with a synthetic aperature radar 23 on board circles the earth and each time it passes over the radar target 21 it takes an image of an area including the radar target. The brightness or intensity of the radar target image is indicative of the level of water in the catch basin of the radar target. From this information the rainfall, runoff, flow rate, evaporation, and soil moisture can be determined.

Figure 3:
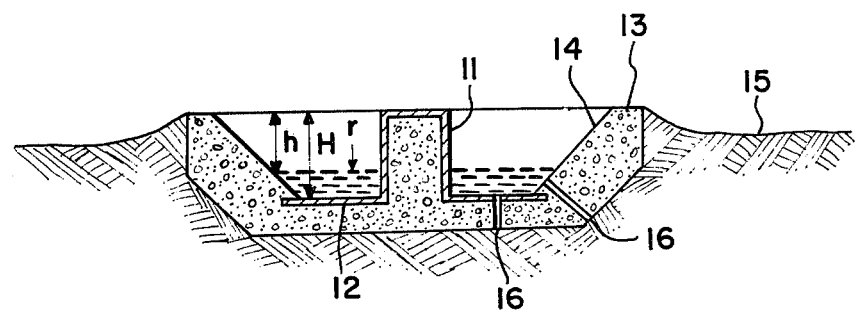
FIG. 3 is an embodiment of the invention which includes water seepage holes in the bottom of the embodiment of the invention shown in FIG. 1.

FIG. 3 shows a modified embodiment of the invention in which soil moisture can be measured. The embodiment of the invention in FIG. 3 includes drain holes 16 through the base plate and the concrete catch basin. As water accumulates within this modified target, its discharge rate through the drain holes into the soil will be proportional to the moisture content of the soil. As water is absorbed into the soil, r decreases and this change can be measured on successive image passes. A number of geographcally dispersed targets would be required to assess overall soil moisture for any large area such as might be involved with desertification, but a single soil moisture target could be used to provide reference data for other remote sensing techniques.

Figure 4:
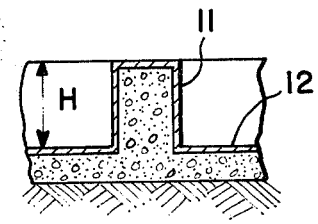
FIG. 4 is a second target that can be used with the embodiment of the invention shown in FIG. 1.
Figure 5:
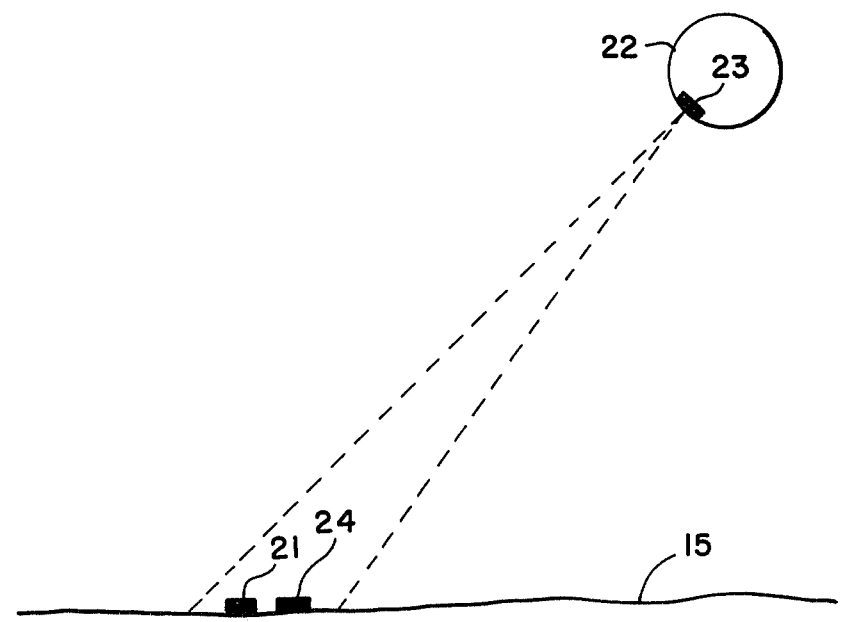
FIG. 5 is a schematic drawing showing how information is gathered from the embodiment of the invention shown in FIG. 1 combined with a second target shown in FIG. 4.

FIG. 4 shows a modified embodiment of the invention in which the catch basin has been eliminated. The preferred techinque for gathering data or information by this invention is shown in FIG. 5 in which an embodiment of the invention in FIG. 4, shown in FIG. 5 as 24, is included with an embodiment of the invention shown in FIG. 1. These two radar targets are placed at a selected location on the surface of the earth. Consequently, when the satellite 22 makes an image of the area including the targets 21 and 24 two bright spots will appear on the image. The relative intensities or brightnesses of these two spots is indicative of the the height of the water level in target 21 as per equation (2). The relative intensities of the images of the two targets can be determined by an individual's measurement observations or alternatively the relative intensities can be determined automatically by a scanning means that scans across the two images and by an electronic divider connected to the scanning means to produce the ratio of the intensities of the two images.

By modifying the catch basin configuration, water flow and soil moisture can be measured. Flow can be measured by locating the modified target in a baffled flume. The modified target is designed so the catch basin has two opposing sides that are open to water flow and a relative size restriction is placed in the exit opening. This design will allow water level around the cylinder to vary as a function of flow rate. Thus, measured water level r will be a function of water flow rate.

Many variations of this invention are apparent. For example, aircraft borne radar could be substituted for the orbiting radar, radar other than synthetic aperature radar could be used, multiple frequency and multiple polarization radar can be used as well as single frequency and polarization, various processing techniques can be used to define measurements and to identify targets, target designs can be modified to allow operation of radar at depression angles other than 45 degrees, and targets can be constructed or fabricated using materials other than those specified in FIG. 1.

The advantages of this invention are numerous. It provides a global remote monitoring capability; it uses standard targets and systems for measuring a wide variety of parameters needed for water status evaluations relative to weather and climate impact; it is simple and low cost, it requires only elementary skills in the field to be used and to be installed, maintained and operated; it provides some image views of ground sites and water sources; its images showing water sources are available with measurement data; it makes changed detection data available; it requires only simple modification to the basic target design to create a variety of different target types for effecting multiple measurement; and it does not require a calibrated radar.

What is claimed is:

1. A radar target for remotely measuring water status at a selected location comprising:
   a cylindrical radar reflector;
   a cylinder flat plate radar reflector symmetrically attached to the bottom of said cylindrical conductor such that the central axis of said cylindrical reflector is perpendicular to the plane of circular reflector; and
   a catch basin means including said cylindrical reflector and said flat plate reflector for catching and retaining water and thereby providing a radar reflector whose reflecting radar cross-section decreases as the water level rises in said catch basin means.

2. A radar target according to claim 1 wherein said outer periphery of said catch basin means is slanted away from said cylindrical reflector whereby the edges of said catch basin means do not interfere with incoming radar signals.

3. A radar target according to claim 1 including drain holes through the base plate and catch basin means whereby soil moisture can be determined by measuring the rate water is absorbed by the soil.

4. Apparatus for measuring the water status at a selected location on the surface of the earth comprising:
   a radar target at said selected location having a radar cross-section area for reflecting signals from a radar;

means included with said radar target for collecting water and for decreasing its radar cross-section area with an increase in collected water;

a radar with means for taking images of its field of view; and means for moving said radar to a position for taking an image of an area on the surface of the earth that includes said radar target whereby the intensity of the reflected energy from said radar target as determined by said image is indicative of the amount of water collected by said radar target.

5. Apparatus for measuring the water status at a selected location according to claim 4 wherein said radar is a synthetic aperature radar.

6. Apparatus for measuring the water status at a selected location according to claim 4 wherein said radar target includes a cylindrical radar reflector, a base plate reflector symmetrically attached to the bottom of said cylindrical reflector such that the central axis of said cylindrical reflector is perpendicular to the plane of said base plate reflector, and a catch basin including said cylindrical reflector and said base plate reflector for collecting water.

7. Apparatus according to claim 6 wherein said radar target includes drain holes in its bottom whereby the moisture in the soil can be measured.

8. Apparatus for measuring the water status at a selected location on the surface of the earth comprising:

a first radar target at said selected location having a radar cross-section area for reflecting signals from a radar;

means included with said first radar target for collecting water and for decreasing its radar cross-section area with an increase in accumulated water;

a second radar target at said selected location having a radar cross-section area that is not changed by water status;

a radar with means for taking images of the area covered by the radar; and means for moving said radar to a position for taking an image of an area on the surface of the earth that includes said first and second radar targets whereby the relative intensity of the reflected energy from said first and second radar targets as determined by said image is indicative of the water status at said selected location.

9. Apparatus for measuring the water status at a selected location according to claim 8 wherein said radar is a synthetic aperature radar.

10. Apparatus for measuring water status according to claim 8 wherein said first radar target includes a cylindrical radar reflector and a flat circular plate radar reflector symmetrically attached to the bottom of said cylindrical reflector such that the central axis of said cylindrical reflector is perpendicular to the plane of said flat base plate reflector and means for collecting water including said cylinder reflector and said flat circular plate reflector.

11. Apparatus according to claim 10 wherein said second radar target includes a cylindrical radar reflector with a flat circular radar reflector symmetrically attached to the bottom of said cylindrical reflector such that the central axis of said cylindrical reflector is perpendicular to the plane of said flat circular plate reflector.

* * * * *

UNITED STATES PATENT AND TRADEMARK OFFICE
CERTIFICATE OF CORRECTION

PATENT NO. : 4,184,155
DATED : January 15, 1980
INVENTOR(S) : Wilford E. Sivertson, Jr.

It is certified that error appears in the above—identified patent and that said Letters Patent is hereby corrected as shown below:

On the cover page the spelling of "Silvertson, Jr." should read -- Sivertson, Jr. --.

Signed and Sealed this

Sixteenth Day of June 1981

[SEAL]

Attest:

RENE D. TEGTMEYER

Attesting Officer     Acting Commissioner of Patents and Trademarks